United States Patent
Sotnikov et al.

(10) Patent No.: US 11,748,263 B2
(45) Date of Patent: Sep. 5, 2023

(54) INTERNET CACHES WITH OBJECT HINTS

(71) Applicant: Akamai Technologies, Inc., Cambridge, MA (US)

(72) Inventors: Dmitry Sotnikov, Rishon Lezion (IL); Denis Emelyanov, Bat Yam (IL); Dvir Tuberg, Netanya (IL); Arnon Shoshany, Rehovot (IL); Michael Hakimi, Holon (IL); Kfir Zigdon, Neshua (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/454,910

(22) Filed: Nov. 15, 2021

(65) Prior Publication Data
US 2023/0153241 A1    May 18, 2023

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 2212/60; G06F 2212/46; G06F 16/172
See application file for complete search history.

(56) References Cited

U.S. PATENT DOCUMENTS

| | | | |
|---|---|---|---|
| 5,787,470 A | 7/1998 | Desimone et al. | |
| 6,108,703 A | 8/2000 | Leighton et al. | |
| 6,427,187 B2 | 7/2002 | Malcolm | |
| 7,058,706 B1 | 6/2006 | Iyer et al. | |
| 7,096,263 B2 | 8/2006 | Leighton et al. | |
| 7,096,266 B2 | 8/2006 | Lewin et al. | |
| 7,133,905 B2 | 11/2006 | Dilley et al. | |
| 7,240,100 B1 | 7/2007 | Wein et al. | |
| 7,251,688 B2 | 7/2007 | Leighton et al. | |
| 7,274,658 B2 | 9/2007 | Bornstein et al. | |
| 7,293,093 B2 | 11/2007 | Leighton et al. | |
| 7,484,002 B2 | 1/2009 | Swildens et al. | |
| 7,523,181 B2 | 4/2009 | Swildens et al. | |

(Continued)

OTHER PUBLICATIONS

"SquidFaq/CacheDigests—Squid Web Proxy Wiki," downloaded on Jul. 22, 2021, 10 pages. Available at: https://wiki.squid-cache.org/SquidFaq/CacheDigests#How_and_why_are_they_used.3F.

(Continued)

*Primary Examiner* — Shawn X Gu (57) ABSTRACT

Improvements to internet cache protocols are disclosed. In certain embodiments, a client-facing proxy server can query peer servers to determine whether they have a copy of an object that the proxy server needs. The peer servers can respond based on object information that the peer servers stored about objects they have in cache, where the peers recorded such object information previously when ingesting the objects into their cache and stored it separately from the objects for fast access (e.g. in RAM vs. on disk). This information can be expressed in a compact way using just a few object flags, and enables the peer server to quickly respond and with detail about the status of objects they hold. The proxy server can make an intelligent decision about which peer to use, and indeed whether to use a peer at all.

12 Claims, 6 Drawing Sheets

(56) References Cited

U.S. PATENT DOCUMENTS

| | | | |
|---|---|---|---|
| 7,574,499 | B1 | 8/2009 | Swildens et al. |
| 7,603,439 | B2* | 10/2009 | Dilley .................. H04L 67/568 711/122 |
| 7,716,367 | B1 | 5/2010 | Leighton et al. |
| 7,725,602 | B2 | 5/2010 | Liu et al. |
| 7,912,978 | B2 | 3/2011 | Swildens et al. |
| 7,925,713 | B1 | 4/2011 | Day et al. |
| 7,996,531 | B2 | 8/2011 | Freedman |
| 8,195,831 | B2 | 6/2012 | Swildens et al. |
| 8,683,002 | B2 | 3/2014 | Harvell et al. |
| 9,460,229 | B2* | 10/2016 | Lepeska .............. G06F 16/9574 |
| 10,440,142 | B2 | 10/2019 | Menai et al. |
| 10,581,948 | B2 | 3/2020 | Goel et al. |

OTHER PUBLICATIONS

Balzer, C., "Re: Returning stale objects to neighbors", Nov. 15, 1996, 2 pages. Downloaded on Jun. 28, 2021, www.squid-cache.org/mail-archive/squid-users/199611/0221.html.

Berners-Lee, T. et al., Network Working Group, RFC: 3986. "Uniform Resource Identifier (URI): Generic Syntax." Jan. 2005. 61 pages.

Chandhok, N., "Web Distribution Systems: Caching and Replication," downloaded Jun. 28, 2021 from https://citeseerx.ist.psu.edu/viewdoc/download?doi=10. 1. 1. 108. 1999&rep=rep1&type=pdf, 22 pages.

Chankhunthod, A. et al., "A Hierarchical Internet Object Cache," Proceedings of the USENIX 1996 Annual Technical Conference San Diego, California, Jan. 1996, 12 pages.

Lovric, I., Internet-Draft, ICP Working Group, "Internet Cache Protocol Extension," Oct. 21, 1999, 16 pages.

Nordstrom, H., "Re: icp_hit_stale & allow-miss," Apr. 4, 2006, 2 pages. Downloaded on Jun. 28, 2021, www.squid-cache.org/mail-archive/squid-users/200604/0062.html.

PTAB IPR Board Decision, IPR 2016-01001 for USP 8,683,002, board decision not to institute trial for Akamai v Limelight, Nov. 2016, 17 pages.

PTAB IPR Patent Owner Response, IPR 2016-01001 for USP 8,683,002, patent owner response with exhibits for Akamai v Limelight, Aug. 2016, 109 pages.

PTAB IPR Petition, IPR 2016-01001 for USP 8,683,002, petition with exhibits for Akamai v Limelight, May 2016, 288 pages.

Uzunov, A., "Speeding up TOR With SPDY," Nov. 15, 2013, 124 pages.

Wessels, D. et al., "ICP and the Squid Web Cache*." Aug. 13, 1997, 25 pages.

Wessels, D., Network Working Group, RFC: 2187, "Application of Internet Cache Protocol (ICP), version 2," Sep. 1997, 24 pages.

* cited by examiner

FIG. 1

| Object Flags Bitmask - 3 bit | | |
|---|---|---|
| Bit position 0 | Bit position 1 | Bit position 2 |
| 0 = Config. TTL is different than object header TTL (Maybe safe to use)<br><br>1 = Config. TTL is same as object header TTL (Safe) | 0 = Config. TTL is greater than object header TTL (Safe for Stale)<br><br>1 = Config. TTL is less than object header TTL (Safe for Fresh) | 0 = Object is not associated with ETag or Last Modified Date (quick validation via IMS not possible)<br><br>1 = Object is associated with ETag or Last Modified Date (quick validation via IMS possible) |

INTERNET CACHES WITH OBJECT HINTS

BACKGROUND

Technical Field

This application generally relates to Internet object caches.

Brief Description of the Related Art

Internet caches are well known in the art. Such caches typically store public or otherwise reusable objects close to end users. When an internet cache receives an end user client request for a given object (usually via HTTP, though this is not required), it can first check its local cache for the given object. The local cache may be implemented and referred to as an object store, a file system, database, or other storage technology. The internet cache determines if the object is available, not expired, and otherwise valid to serve in response. If not, it can issue a forward request to fetch the object from a parent cache, or from an origin server associated with a content provider. The origin server provides the object. The cache can store this object and reuse it for subsequent end user client requests without the forward request operation, which is time consuming and burdens the origin server. The origin server can control whether the object is permitted to be cached (e.g., using Cache-Control object header), and for how long, (e.g., with Max-Age option). Internet caches can be implemented in many ways, for example as a forward or reverse proxy server, or as a transparent cache. Content delivery networks (CDNs) typically use proxy servers with caches, to improve the delivery of websites, web applications, and other online content such as streaming media and file downloads. A CDN usually has many proxy servers distributed across the Internet, e.g., located in end user access networks, peering points, or otherwise.

Cached objects are usually associated with a time to live (TTL) value, which controls how often the server must revalidate the object with the origin to check if it is still fresh (rather than being stale due to an update, etc.). The TTL value for an object can be set in multiple different ways. As mentioned, when responding with an object, the origin server can attach an HTTP header (e.g., Max-Age) that specifies the TTL. A content provider can also specify the TTL for objects (or classes/categories of objects) in configuration information that is delivered to the cache in an out-of-band control channel. It is known in the art to use configuration information that is defined by or for a content provider and installed in servers—or even included in headers—to control how such servers respond to object requests for a given content provider's objects. An example of such configuration information, often referred to as 'metadata' is described in U.S. Pat. No. 7,240,100, which is incorporated herein by reference for all purposes. Metadata can set TTLs (i.e., referred to as the "metadata TTL" or "configuration TTL") but is typically overridden by TTLs specified in an objects' header field (if any).

Internet caching systems have grown in complexity over time. Caches may be arranged in tiers (as a cache hierarchy, described in U.S. Pat. No. 7,603,439, incorporated herein by reference) so that parent cache tiers can be queried for an object before going back to the origin. A cache may use a standardized protocol named Internet Cache Protocol (ICP) (RFC 2187) to ask peer caches whether they have the object before going forward. The ICP protocol defines a request and response message exchange that enables an HTTP server to query other peer servers, receive a response(s), and to select a peer from which to get the object if available. Such optimizations improve the performance and origin offload provided by the system.

In ICP, quick responses to queries are important. In the context of ICP and similar protocols, a peer may respond that it has an object based on the cache entry index. But when the querying server asks for the object, the peer may discover that the object is actually expired or otherwise unsuitable to serve after reading the object and object headers from its cache, which is typically on disk. This is wasteful and delays cache operations. While a peer could pull the object from object storage (a full check) before responding to the ICP query in the first place, that would also be wasteful and cause delay.

This patent document discloses improvements to Internet caches, caching systems, and the ICP protocol, that address the above problems. Improvements may be found in performance, efficiency of processing and memory usage (including cache space on disk), and otherwise.

More information about caching and CDN technologies can be found in the following documents, the teachings of which are hereby incorporated by reference in their entireties: U.S. Pat. Nos. 6,108,703; 7,293,093; 7,096,263; 7,096, 266; 7,484,002; 7,523,181; 7,574,499; 7,240,100; 7,603, 439; 7,725,602; 7,716,367; 7,996,531; 7,925,713; 7,058, 706; 7,251,688; 7,274,658; 7,912,978; 8,195,831.

The teachings presented herein improve the functioning of a computer system itself, improving the caching function in an individual server as well as that of a larger distributed system comprised of many such servers. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of any issued patent define the scope of protection.

Improvements to interact cache protocols are disclosed. In certain embodiments, a client-facing proxy server can query peer servers to determine whether they have a copy of an object that the proxy server needs. The peer servers can respond based on object information that the peer servers stored about objects they have in cache, where the peers recorded such object information previously when ingesting the objects into their cache and stored it separately from the objects for fast access (e.g. in RAM vs. on disk). This information, which can be expressed in a compact way using just a few object flags, enables the peer server to respond with, e.g., a "miss", or that they have a "stale" or "fresh" copy of the object (and in some cases, that they have the object but cannot reliably determine whether it is fresh or stale). The peer servers can respond quickly because the object information is in, e.g., RAM and they do not need to consult a relatively slow disk for the object and object headers. The peer servers can be aided in such evaluation by the proxy server appending the information it knows about the object (e.g., the time to live or TTL) when sending the query to the peers.

Because the peer servers can respond with a richer set of information about the object they may have, compared to prior art solutions, the proxy server can make a more intelligent decision about which peer to use, and indeed whether to use a peer at all rather than itself going forward to a parent cache or origin server. For example, if the proxy has a stale object and the peer servers also have stale copies of the object, the proxy server can go forward. Further, if a proxy server does not have the object, and a peer server responds that it has the object but it is stale, the proxy server may wait for another proxy server that has a fresh copy, but ultimately decide to request the "stale" object since the peer can easily revalidate it.

In addition, the object information can be extended to capture information about whether the object can be revalidated (e.g., with a timestamp or eTag for if-modified-since revalidation). That enables the peer to opportunistically delete objects that lack such information and are expired when consulting the object information.

Hence the invention can improve performance in caching systems and reduce wear on equipment.

The claims are incorporated by reference into this section, in their entirety.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. Likewise, basic familiarity with well-known database technologies and terms, such as relational databases (RDBMS), SQL databases and queries, NoSQL databases and/or key-value approaches, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Overview

When a proxy server receives a request from a client device for a given object, it can first search its local cache to see if it has a copy of the object and whether that copy is fresh (that is, the object's time to live (TTL) value has not expired). The proxy server can also check whether it is otherwise valid to serve to the client. If the object is not available to serve to the client for any of those reasons, there is a cache miss. In this case, the proxy server can check with "peer" servers, typically servers in the same data center or otherwise nearby in network distance terms, to see if such peers have a fresh copy of the object. It is known in the art to use a protocol named "Internet Cache Protocol" or ICP for this query. In ICP, first the proxy server queries the peer servers to see if one or more of them has the object. Multiple peer servers may respond that they have the object. Typically, the proxy server asks for the object from the first peer to respond (although it could be via other selection mechanism if there is more than one). But there is a problem: traditionally a peer server only checks whether it has the object and not whether it is actually fresh. During the second step, therefore, the object could turn out to be stale, i.e., a "false" hit, In this case the entire process has been a waste. The peer could check the freshness of the object before responding, but it would also be wasteful for the peer server to check whether the object is fresh on the first query, because to do this generally requires pulling the object from the cache to read the object headers, which typically requires a relatively slow access to disk.

According to the teachings of this patent document, a peer server can capture a few items of information about an object at the time it initially stores the object in the cache. The information can be used to avoid the above problem and offer several advantages. In preferred embodiments, this information can be captured in just a few bits.

For example, a peer server can capture information about the TTL associated with an object before it stores it. The TTL value for an object can be given in a header field (e.g., Max-Age option) of the object, as well as in configuration information for the content provider stored at the server. Generally the TTL in the header field takes precedence over the configuration information's TTL. So for example, when the object is stored, the peer server can compare the two TTL values, and set flags to indicate whether the configuration TTL is equal to, greater, or less than the object's header field TTL. Such flags can be recorded for cached objects and maintained in a memory location (e.g. in RAM) that is more quickly accessible than the cache entry in the object cache. While the peer server could record the expiration time of each cached object in memory, it is preferred to use the flags because it is much more memory efficient, requiring only a few bits per object instead of multiple bytes, such as a 32 bit timestamp.

When a peer server receives an ICP query for a given object, the peer server can check whether it has the object. If it does, it can quickly consult the previously recorded object flags and use them to indirectly evaluate the freshness of the object. While the peer server may not be able to determine the freshness in all situations, there will be cases in which the peer server can safely determine that the cached object must be fresh or must be stale.

To evaluate freshness, the peer server can use the configuration TTL from the content provider's configuration file. In a preferred embodiment, the requesting server (ICP client) attaches the relevant configuration TTL to the ICP query, so the peer server does not need to access its own cache at all for such information.

Here are some examples of evaluating freshness based on object flags:

A. If the object flags indicate that the configuration TTL is equal to the header TTL of the cache object, then the configuration TTL is "safe" to use. Hence the peer server can determine right away whether it has the object and whether the object is fresh based on the configuration TTL.

B. If the object flags indicate that the configuration TTL is greater than the header TTL, then the header TTL must be expired if the configuration TTL is expired. So, the configuration TTL can be used to reliably determine if the object is stale, and the server could reply that it has the object but it is stale.

C. If the object flags indicate that the configuration TTL is less than than the header TTL, then the header TTL must be unexpired if the configuration TTL is unexpired. So, the configuration TTL can be used to reliably determine if the object is fresh.

There are some cases in which the object flags will not provide enough information to be certain about freshness. in such cases, the peer server can default to traditional ICP server operation, or in some cases, respond with "unsure" and let the proxy server decide. For example, for case B above, if the configuration TTL is unexpired, then using known ICP conventions, the server can return a "hit", which may turn out to be an expired object (a false hit, as in the prior art). Statistics can be kept about the ultimate result, and possibly this setting could be changed if there are too many false hits.

For case C above, if the configuration TTL is expired, then per known ICP conventions the server can return a "hit", which may turn out to be an expired object (a false hit, as in the prior art). Statistics can be kept about the ultimate result, and possibly this setting could be changed if there are too many false hits. If there were a concern that these false "hits" were preventing other peers from winning the ICP query (other peers who really did have a fresh object), then the behavior could be changed here.

The object flags can be used for a second kind of optimization, as well. Another object flag can be set by the peer server at the time of ingesting the object into cache, and this object flag can indicate whether or not the object (and/or origin) supports an ETag or last modified date. As known in the art, these two functionalities enable a server to quickly re-validate a given object with origin if the object has not changed. Generally, if the object did not arrive with these fields, then these quick revalidation cannot be done.

When the peer server checks the object metadata during the ICP process, if the object is reliably determined to be stale and neither the ETag or Last Modified Date methods are supported, then there is no way to quickly revalidate the stale object. Hence, the peer server can take the opportunity to delete the stale object from the cache, saving cache space and making room for other objects. Also, the peer can respond to the ICP query. For example, it could send a message indicating a "miss" (it does not have the object); this is because the peer server does not want to say "stale", as it cannot revalidate so it must fetch the object as if it did not have it. As another example, the peer server could respond with a dedicated "non_refreshable" response, so the proxy server (ICP client) can make an intelligent decision based on this information, which may include to stop waiting for responses and itself issue a forward request to a parent/origin, or reduce the timeout period for waiting on ICP responses, or behave as usual.

With the foregoing by way of overview more details are now provided.

System Architecture

Figure 1:
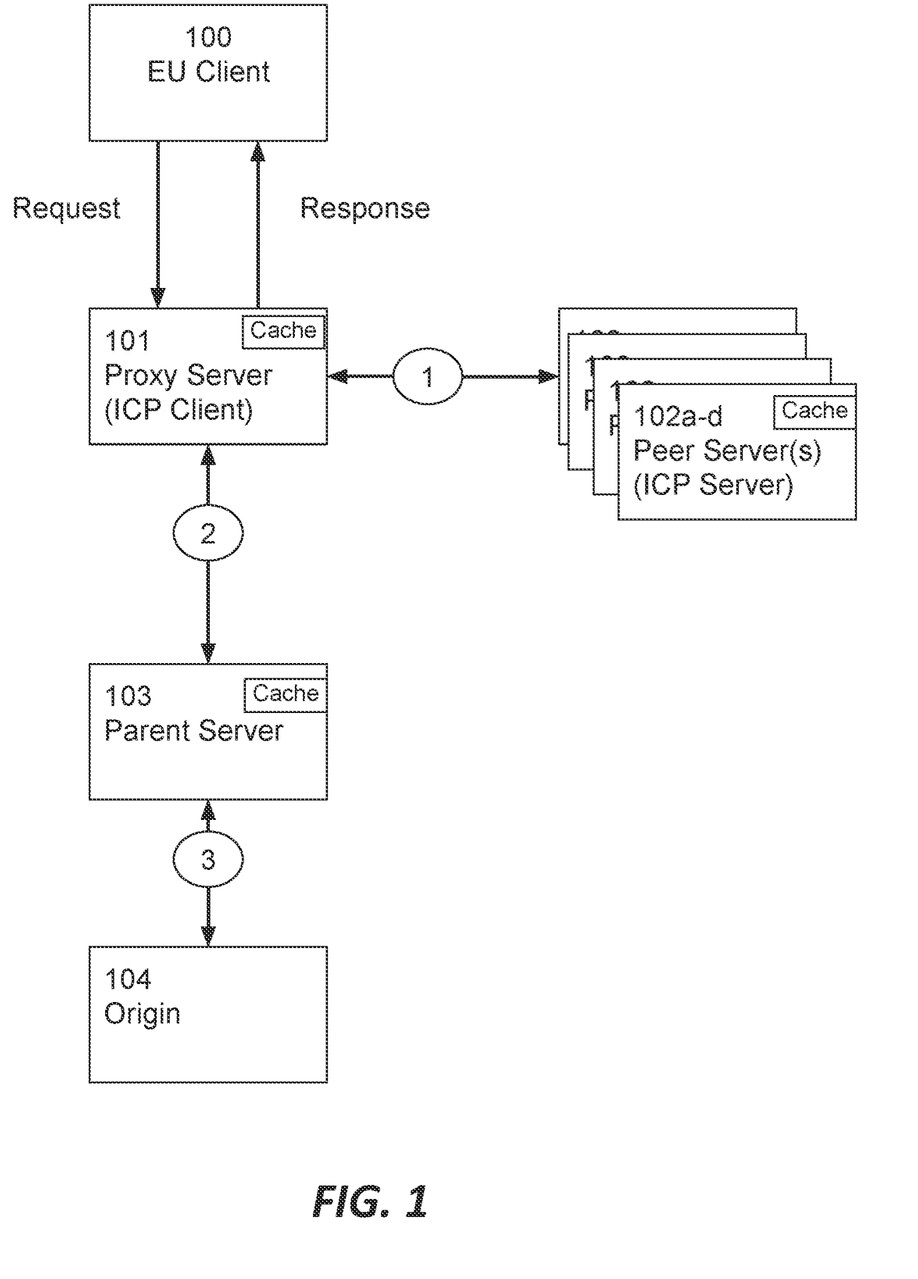
FIG. 1 illustrates various options for fetching an object upon a cache miss at proxy server 101, in accordance with one embodiment of the teachings hereof.

FIG. 1 depicts a basic example of a network arrangement. End user (EU) client 100 is a laptop, mobile device, or the like. Proxy server 101 is the client facing server that receives the client request for the object. In some implementations, the proxy server 101 is referred to as an edge server because it is located in or near end user access networks, but this is not a requirement.

Peer servers 102a-d are other servers (and may be other edge servers) that preferably have low latency to server 101. Usually they are in the same data center. Parent server 103 is another proxy server deployed closer to the origin 104 and represents one example of a parent tier of a cache hierarchy, which is a feature known in the art. However parent tiers can have a wide variety of configurations and indeed are not used at all in some implementations.

FIG. 1 illustrates various options for fetching an object upon a cache miss at proxy server 101. Option 1 is to contact peer servers 102a-d using an ICP protocol or the like. If that fails to locate an object, then option 2 is a message exchange with the parent server 103 for the object. If that also fails to locate a valid object, then option 3 is to contact the origin server 104 (either directly or, as shown here, via the parent server 103).

Requests, response, and other messages in FIG. 1 can be sent using HTTP protocol, without limitation.

Object Information/Flags

Figure 2:
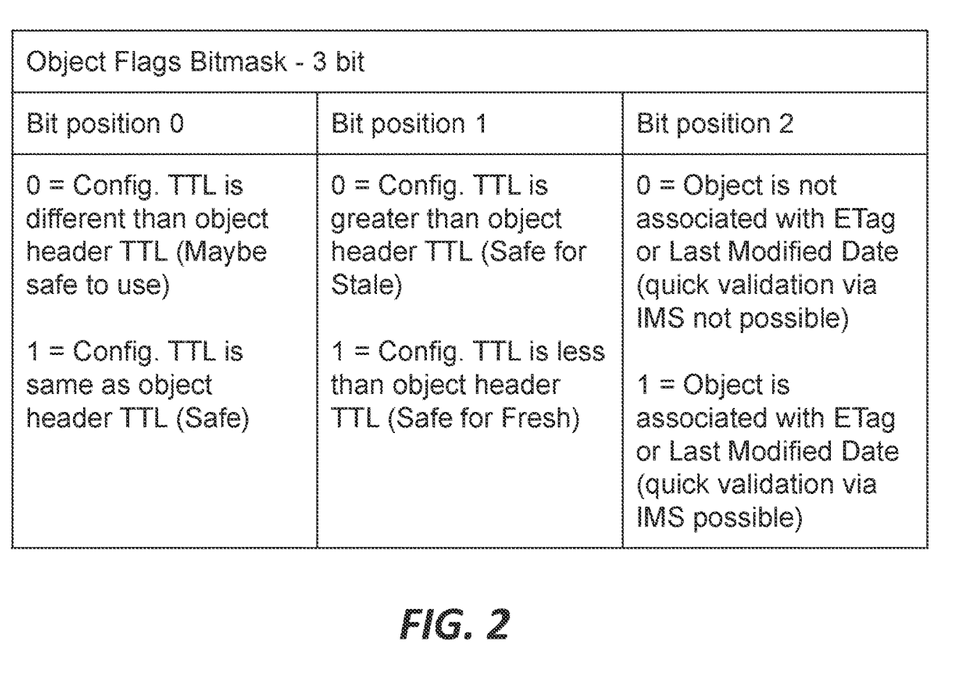
FIG. 2 is a diagram showing one possible implementation of object flags, in accordance with one embodiment of the teachings hereof.

FIG. 2 is a diagram showing an implementation of the object information recorded at object ingest time, as was described earlier. It is a three bit bitmask field and can be thought of as a set of three flags. The first two bits relate to the TTL estimation (bite0, bit1), and the third bit (bit2) relates to the support for quick re-validation functionality.

The foregoing is but one example of an implementation. For example, one can also use a subset of the functionality described herein by using a two bit approach (i.e., only bit0 and bit1 in FIG. 2) without using revalidation.

Recording Object Information/Flags When Ingesting Object

Figure 3:
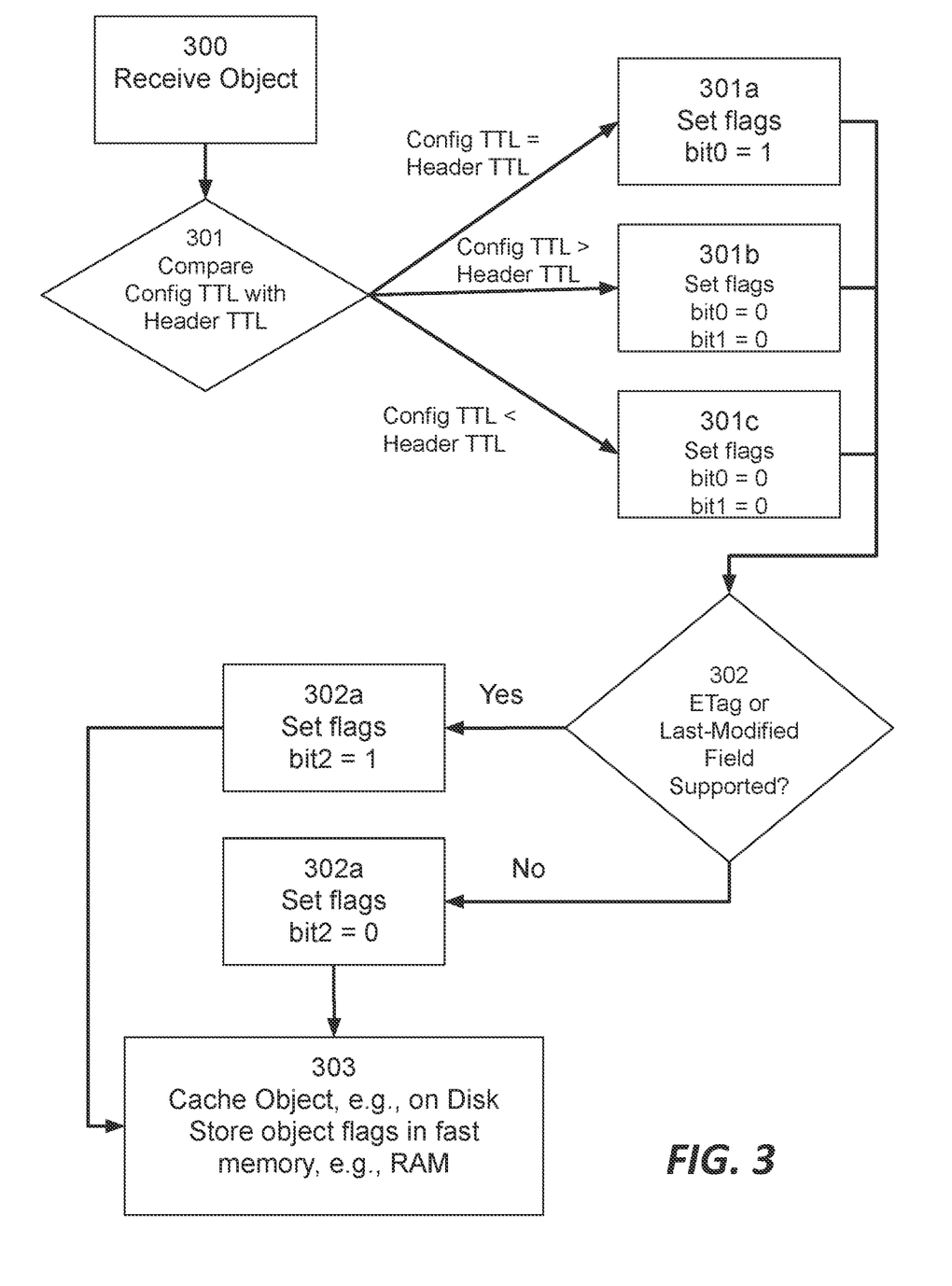
FIG. 3 illustrates logic executable at a peer server at the time that a given object is ingested into the cache of the peer server, in accordance with one embodiment of the teachings hereof.

FIG. 3 illustrates an algorithm executing at a server (e.g., a peer server in FIG. 1) at the time that a given object is ingested into the cache of the server. It illustrates how the bit fields are set.

At step 300, the server receives an object for storage in its local cache. The object could be received for a wide variety of reasons, e.g., the peer server queried a parent cache or an origin server for the object, the object is being pre-positioned at the server, and so on.

At step 301, the server examines the object headers that came with the object to find the object header's specified TTL value. The server also checks its configuration file applicable to the object (e.g., applicable to the domain and/or content provider) to find the TTL specified by configuration ('Config TTL'). The server then compares the two TTLs and sets the bits accordingly, at steps 301a-c.

At step 302. the server checks whether this object supports ETag or Last Modified fields. This can be accomplished by checking the object for such header fields and/or checking with a configuration file applicable to the origin. The server sets the third bit to indicate whether either field is supported, see 302a-b.

After recording the information about the object, the server then stores the object in the local cache, at step 303. The three-bit object information record is stored separately from the object. Preferably the object information is stored in a quick access memory device, e.g., in RAM, to allow fast lookups to see if the object exists in the cache, while typically the object itself would be on disk (although it could be in RAM due to recent requests and other cache management logic).

System Operation

The operation of the system of FIG. 1, as modified by the teachings hereof, is now described. The terms ICP client and ICP server are used in this section. In the context of FIG. 1, the proxy server 101 would correspond to the ICP client, and the peers 102a-d are ICP servers.

Compared to prior art ICP solutions, the teachings hereof contemplate that an ICP client can append to its ICP request a TTL value for the object it seeks, and a flag named ICP_FLAG_VALIDATED_TTL to indicate if the ICP client knew this TTL from the the object header (i.e. validated) or from configuration information.

The ICP server can use a flag in the ICP response named ICP_FLAG_STALE_OBJECT to indicate that the peer has the requested object, but it is stale and so would need to be refreshed before serving.

In general, the ICP client does not have the needed object at all, then it will wait for an ICP server with the fresh object, that is, with the stale flag "off". If no such ICP servers respond before the timeout passes or all the peers respond with the stale flag "on", the ICP client will use an ICP server with the stale flag set that responded first. There is a potential benefit in going forward through the ICP server that has a stale object because it may refresh it using If-Modified-Since and get an HTTP 304 NOT MODIFIED response which can be faster than getting the whole object and saves bandwidth.

If the ICP client already has the needed object, but it is stale, then it can avoid using ICP servers that reply with ICP_FLAG_STALE_OBJECT set to "on". It can be faster for the ICP client to refresh the object itself. The additional hop (any hop) to the ICP server adds a penalty to performance.

ICP Client

Figure 4:
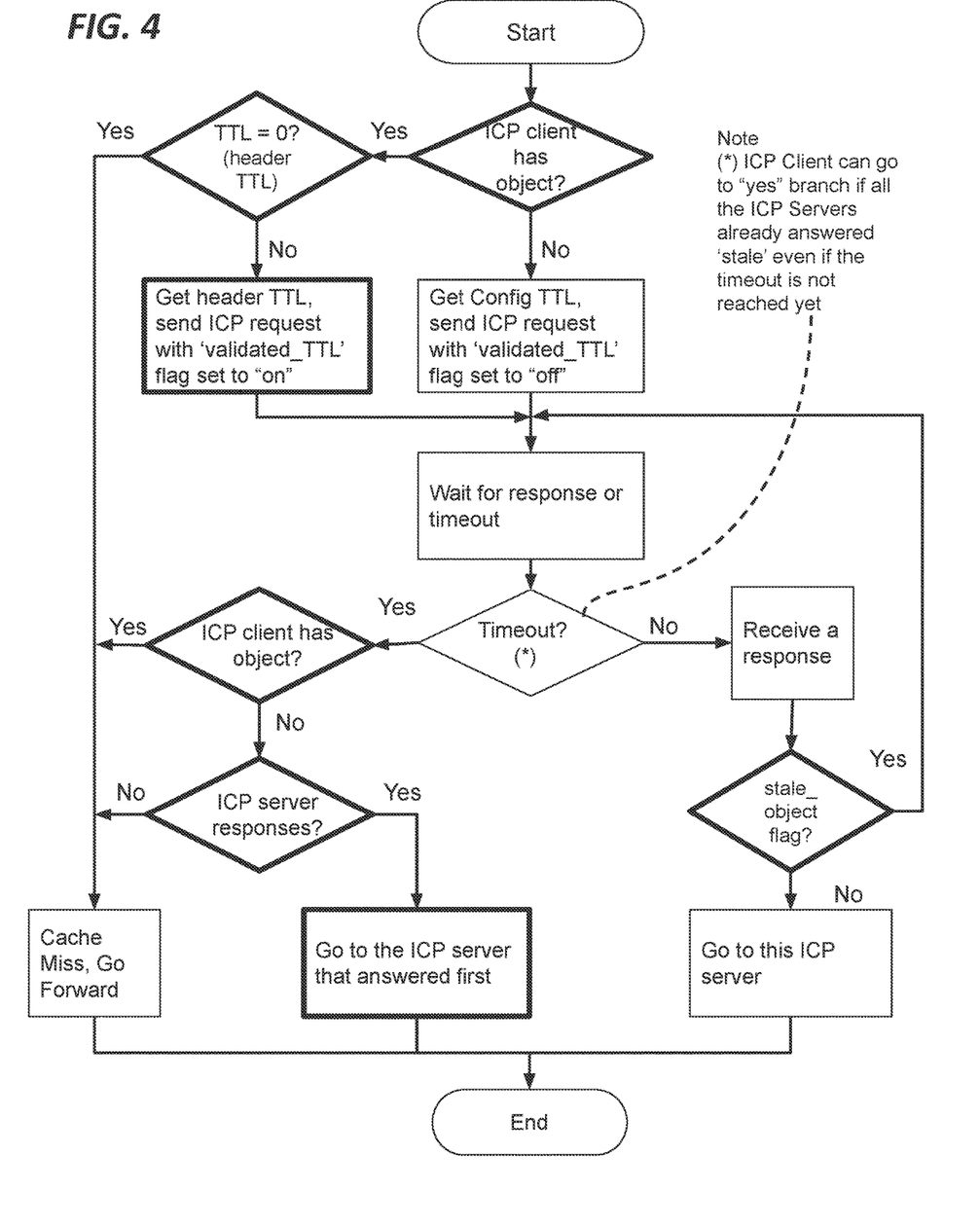
FIG. 4 illustrates logic executable at an ICP client, in accordance with one embodiment of the teachings hereof.

FIG. 4 presents a detailed algorithm for the ICP client. Elements with thick borders are new compared to traditional ICP implementations. FIG. 4 assumes the ICP client already decided to use ICP. If the object is not cacheable, or the ICP client had a fresh object in cache or didn't have any peers configured, then the entire ICP step will be skipped and FIG. 4 is not relevant. Also, note that if an ICP client has a stale object and its header TTL is less than a configurable number of seconds (e.g., 6 seconds, or other number after tuning), the ICP step could be skipped entirely, because this object has been given a relatively small TTL and so it is unlikely that a fresh copy of the object will be found in a peer. As mentioned earlier, the system can be configured to monitor how often an ICP server responds that it has a fresh object but in reality it was a mistake, e.g., the ICP server needed to go forward to serve the object, and if there are a high number of such occurrences it can be addressed. In cases of doubt the ICP client can assume the object to be fresh and such that the processing can be equivalent to the prior art processing.

Walking through FIG. 4, the ICP client first determines whether it has the object. If yes, it will check to see if the object has a TTL of 0. If the TTL is set to 0, this means that the object must be revalidated with origin each time using an if-modified since request with the object's eTag or if-modified-since headers, and this is treated as a cache miss in FIG. 4 because the ICP peers will not have a "fresh" object either without revalidating, so using ICP is not helpful. If the object has a non-zero TTL, then the ICP client sends an ICP request to one or more ICP servers with the header TTL and ICP_FLAG_VALIDATED_TTL set to 'on'. If the ICP client does not have the object it cannot read the object header TTL, so it gets the TTL from the configuration file, and sends the ICP request with ICP_FLAG_VALIDATED_TTL set to 'off'.

After sending an ICP request, the ICP client waits for a response from the ICP servers. During the ICP response period (while Timeout=No), if an ICP server responds that it has the 'fresh' object, then the ICP client can go forward to that ICP server right away. If an ICP server responds that it has the object but the stale_object flag is set (this means the ICP_FLAG_STALE_OBJECT flag), then the ICP client continues to wait to see if any other ICP servers have the fresh object.

If the ICP response period finishes or all ICP servers have answered (or Timeout=yes), it must mean that there are no responses with a fresh object. Hence, if the ICP client has the object, it treats the situation as a cache miss and fetches the object itself. If it does not have the object, then it goes to the first ICP server that responded with a stale_object flag (if there are any such responses). In some implementations, the server can log statistics to count the number of cases when the object received from an ICP server was discarded by purge sequence check.

ICP Server

Figure 5:
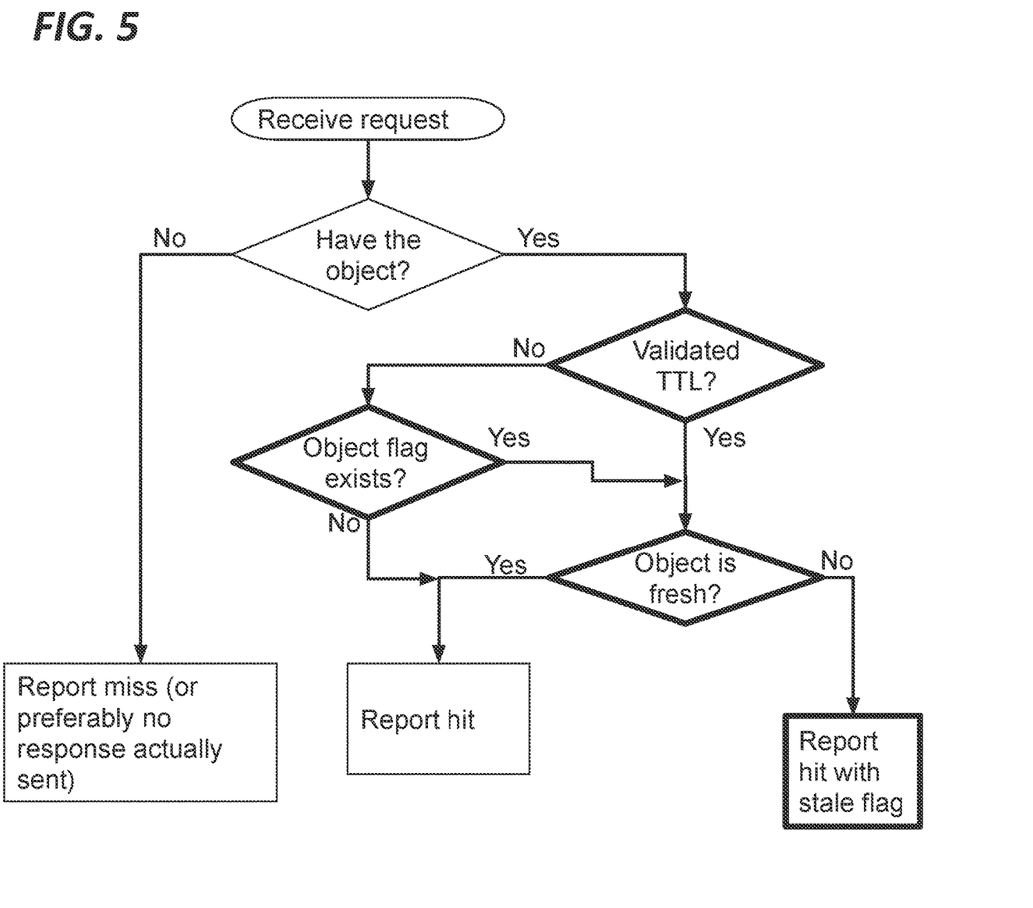
FIG. 5 illustrates logic executable at an ICP server, in accordance with one embodiment of the teachings hereof; and, FIG. 6 is a block diagram illustrating hardware in a computer system that may be used to implement the teachings hereof.

FIG. 5 presents a detailed algorithm for the ICP server. In general, if an ICP server finds a requested object in its cache, the ICP server can use the ICP_FLAG_VALIDATED_TTL and the recorded object information (as already described with respect to FIG. 2/FIG. 3) to evaluate the freshness of the object.

Turning to FIG. 5, the ICP server receives an ICP request. The ICP server checks whether it has the object. If not, the situation is simple—it is a cache miss, and preferably it refrains from sending a response (although in some implementations the ICP server could respond with the 'miss'). If the ICP server has the object ("Yes" branch), it can use the TTL received as part of the ICP request (from the ICP client) to validate its freshness. There are two options at the "Validated TTL" block, first, if the TTL marked as a validated TTL (based on the objects headers from the ICP client) then under assumption that the TTL is the same for the object it has, the freshness will be checked based on this TTI. If the ICP client TTL was taken from configuration it will be marked as an unvalidated TTL, and in this case, the ICP server checks (at "Object flag exists" in FIG. 5) whether it has object flags, per FIG. 2. If not, then the ICP server reports a hit—in fact the object may be stale, but there is no way to verify and this is standard prior art operation). If yes, then it can check the freshness based on the TTL received from ICP client, which was based on ICP client config (config TTL), and the object flag as described at FIG. 2. Based on that information it can determine if the object is fresh or stale ("Object is fresh?" in FIG. 5). A table summarizing the outcomes is shown below:

for ETags/Last-Modified Date and hence the object cannot be refreshed. The server can report this fact to the ICP client, which enables the ICP client to go forward to get the object without waiting for a timeout due to the ICP server not responding.

Reporting & Monitoring

To recognise the impact of this project the system can monitor both the turnaround time ("TAT", the time from the EU client sending the request to the arrival of the first response byte) at high percentiles and the number of forward requests. In addition one can add new reporting to assess the impact of the change during the rollout, both for ICP as a result of stale content and as a result of cache miss.

There may be several potential corner cases when new implementation may lead to performance degradation. New reporting will be added to monitor such cases.

- If two proxy servers 101 in a data center both have the same stale object and both get requests for this object within a short time interval, they both will do an IMS request to the parent or origin. With current implementation there will be only one IMS request from one of them. It is unknown how often it may happen.
- If one proxy server does not have an object and thus cannot know if the origin overrides TTL and a peer 102 knows that TTL is overridden, but does not know the

| Object Flags | TTL check | Determination |
| --- | --- | --- |
| [bit position 0 = 0] Config TTL = header TTL | Config TTL expired Config TTL unexpired | Report object stale Report object fresh |
| [bit position 1=0] than object header TTL (Safe for Stale) | Config TTL expired | Report object stale |
| Config. I IL is greater | Config TTL. unexpired | Uncertain; design choice. Can report "fresh" and log outcome of whether actually stale or fresh for future tuning. Alternatively can report "don't know" or "unsure" and let ICP client decide. |
| [bit position 1 = 1] Config. TTL is iess than object header TTL (Safe for Fresh) | Config TTL expired | Uncertain; design choice. Can report "fresh" and log outcome of whether actually stale or fresh for future tuning. Can alternatively choose to report "stale" to avoid pre-empting other ICP server responses. Alternatively can report "don't know" or "unsure" and let ICP client decide. Note that the determination here (and/or the ICP client's decision) may be different than for the uncertain case with respect to bit position 1 = 0. |
| | Config TTL unexpired | Report object fresh |

The above decisions can be reached without reading the object and its headers from the cache (e.g., from the cache on disk). The ICP server can check the freshness of the object only at the moment of decision-making. The object may become stale by the time the forward request arrives from an ICP client. If the monitoring of false-fresh responses shows that this happens a lot, a small delta may be added to the time comparison.

While not shown in FIG. 5, the ICP server can take advantage of the object flag regarding ETags/Last-Modified Date support (bit position 2, FIG. 2) to delete an object that is safely found to be stale (i.e., the two "report object stale" outcomes in the table above), since it cannot be refreshed without pulling the entire object.

An additional optimization is available to the server when bit position 2for the object indicates that there is no support true value, it can only speculate if it's object is stale or not. It is beneficial to know how often this speculation is wrong.

When a proxy server 101 gets a reply with a stale flag set, it waits for sonic time for a better response (without this flag). If this waiting ends without getting a new response, the time is wasted. It is beneficial to know how often it happens to be able to tune the timeout.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
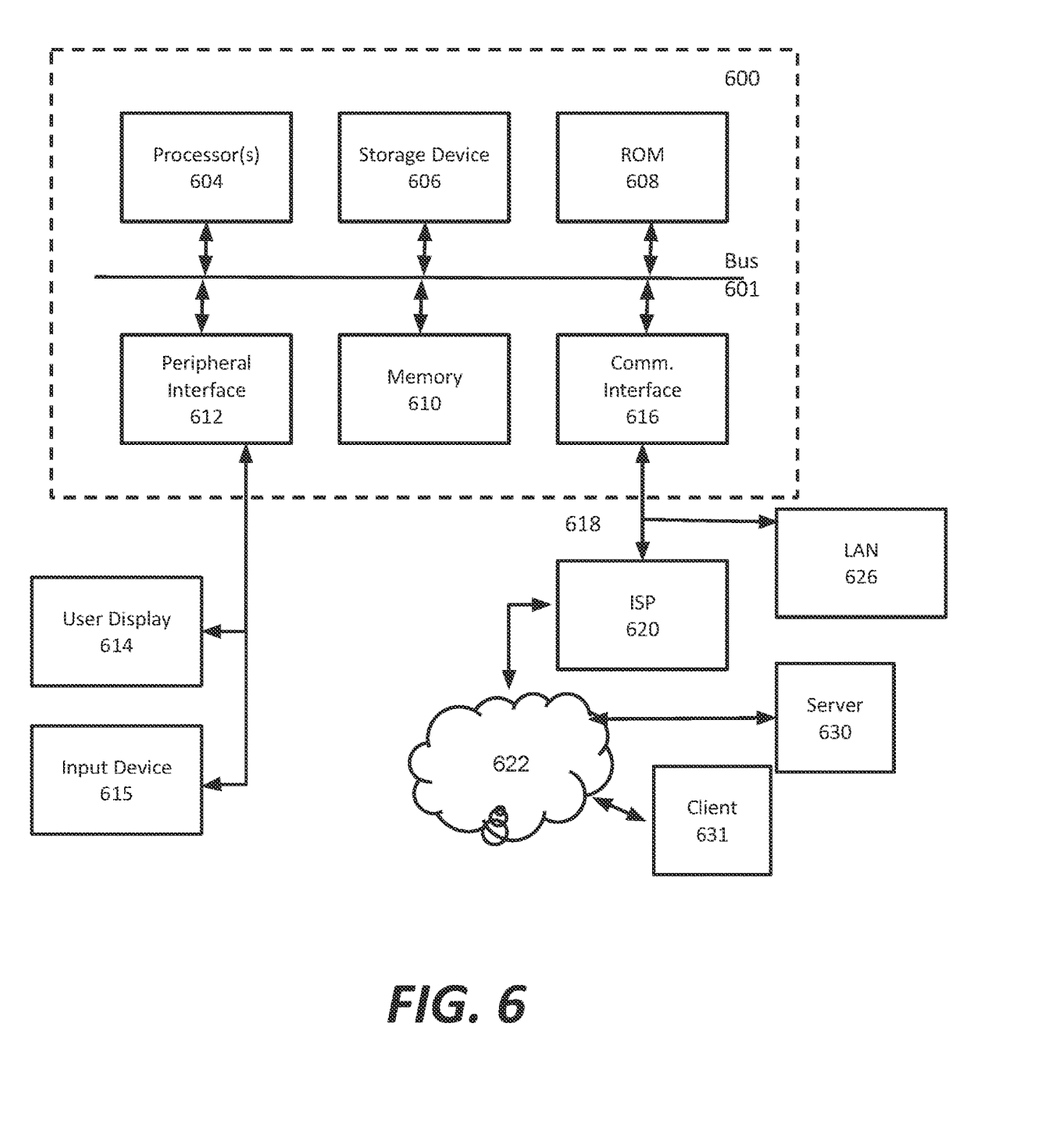

FIG. 6 is a block diagram that illustrates hardware in a computer system 600 upon which such software may run in order to implement embodiments of the invention. The computer system 600 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 600 includes a microprocessor 604 coupled to bus 601. In some systems, multiple processor and/or processor cores may be employed. Computer system 600 further includes a main memory 610, such as a random access memory (RAM) or other storage device, coupled to the bus 601 for storing information and instructions to be executed by processor 604. A read only memory (ROM) 608 is coupled to the bus 601 for storing information and instructions for processor 604. A non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

A peripheral interface 612 may be provided to communicatively couple computer system 600 to a user display 614 that displays the output of software executing on the computer system, and an input device 615 (e.g., a keyboard, mouse, trackpad, touchscreen) that communicates user input and instructions to the computer system 600. However, in many embodiments, a computer system 600 may not have a user interface beyond a network port, e.g., in the case of a server in a rack. The peripheral interface 612 may include interface circuitry, control and/or level-shifting logic for local buses such as RS-485, Universal Serial Bus (USB), IEEE 1394, or other communication links.

Computer system 600 is coupled to a communication interface 616 that provides a link (e.g., at a physical layer, data link layer) between the system bus 601 and an external communication link. The communication interface 616 provides a network link 618. The communication interface 616 may represent an Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches, In operation, the computer system 600 may implement the functionality described herein as a result of the processor executing code. Such code may be read from or stored on a non-transitory computer-readable medium, such as memory 610, ROM 608, or storage device 606. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 618 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method of improving a cache system in which proxy servers request objects from one or more peer servers, comprising, at a given peer server:

when caching an object and an object header in a cache, generating object information based on comparing time to live settings in the object header and in a configuration for a content provider associated with the object;

storing the object information separately from the object and the object header such that the object information can be accessed independently from the object and the object header;

upon receipt of a query about the object from a proxy server, and a determination that the object is present in the cache, determining whether the object is fresh based on the object information, without accessing the object header;

upon a determination that the object is present in the cache and fresh, responding to the proxy server with a fresh object message; and, upon a determination that the object is present in the cache and stale, responding to the proxy server with a stale object message.

2. The method of claim 1, wherein the object information is represented by less than one byte of information.

3. The method of claim 1, wherein the object information is represented by a set of 1-bit flags.

4. The method of claim 1, further comprising:
receiving, with the query from the proxy server, a time to live setting taken from any of: (i) a copy of the object header stored at the proxy server, and (ii) copy of the configuration stored at the proxy server; and,
using the received time to live setting with the object information to deduce whether the object is fresh without accessing the object or the object header in the cache.

5. The method of claim 1, wherein the object information that is generated upon caching the object further comprises whether the object is associated with an e-Tag or a last-modified-date.

6. The method of claim 5, further comprising:
upon receipt of the query about the object from the proxy server, and upon determining the object is present in the cache and stale, consulting the object information to delete the object from the entry when the object is not associated with the e-Tag or the last-modified-date.

7. The method of claim 1, comprising storing the object information in a first memory device distinct from, and faster than, a second memory device holding the object and the object header.

8. A method of improving a cache system in which a proxy server requests objects from at least one peer server, comprising, at the proxy server:
receiving, from a client, a request for an object;
issuing an inter-cache request to the at least one peer server for the object;
appending to the inter-cache request information about a time to live (TTL) for the object known at the proxy server;
receiving a response to the inter-cache request indicating that the at least one peer server has a copy of the object and whether the copy is stale or fresh; and,
based at least in part on the response to the inter-cache request, determining whether (i) to issue a forward request for the object or (ii) to request the object from the at least one peer server.

9. The method of claim 8, wherein the TTL for the object that the proxy server appends to the inter-cache request comprises the TTL extracted from a configuration.

10. The method of claim 8, the response to the inter-cache request being based at least in part on the TTL for the object that the proxy server appended.

11. A cache system, comprising:
a plurality of proxy servers that operate to request objects from one or more peer servers;
each of the one or more peer servers configured to operate to:
when caching an object and an object header in a cache, generate object information based on comparing time to live settings in the object header and in a configuration for a content provider associated with the object;
store the object information separately from the object and the object header such that the object information can be accessed independently from the object and the object header;
upon receipt of a query about the object from a proxy server of the plurality of proxy servers, and a determination that the object is present in the cache, determine whether the object is fresh based on the object information, without accessing the object header;
upon a determination that the object is present in the cache and fresh, respond to the proxy server with a fresh object message; and,
upon a determination that the object is present in the cache and stale, respond to the proxy server with a stale object message;
wherein each of the plurality of proxy servers and the one or more peer servers comprise at least one hardware processor and memory holding program instructions to be executed on the at least one hardware processor to operate as specified above.

12. A non-transitory computer readable medium holding computer program instructions for execution on at least one hardware processor, the computer program instructions including instructions to:
when caching an object and an object header in a cache, generate object information based on comparing time to live settings in the object header and in a configuration for a content provider associated with the object;
store the object information separately from the object and the object header such that the object information can be accessed independently from the object and the object header;
upon receipt of a query about the object from a proxy server, and a determination that the object is present in the cache, determine whether the object is fresh based on the object information, without accessing the object header;
upon a determination that the object is present in the cache and fresh, respond to the proxy server with a fresh object message; and,
upon a determination that the object is present in the cache and stale, respond to the proxy server with a stale object message.

* * * * *